United States Patent [19]
Wood

[11] Patent Number: 5,476,370
[45] Date of Patent: Dec. 19, 1995

[54] OIL PUMP SUBJECT TO PUMPING A TWO PHASE FLOW

[75] Inventor: Russell E. Wood, Fayetteville, N.Y.

[73] Assignee: Carrier Corporation, Syracuse, N.Y.

[21] Appl. No.: 157,544

[22] Filed: Nov. 26, 1993

[51] Int. Cl.⁶ .................................................. F04B 21/00
[52] U.S. Cl. .............................. 417/435; 418/88; 418/94; 418/DIG. 1; 92/79; 184/6.23
[58] Field of Search .................................. 417/435; 92/79; 184/6.23; 418/88, 94, DIG. 1

[56] References Cited

U.S. PATENT DOCUMENTS 3,936,244  2/1976  Drori ........................................ 417/435
4,747,471  5/1988  Ballentine et al. ..................... 184/6.23
5,051,072  9/1991  Yano et al. ............................... 417/435
5,085,561  2/1992  Yano et al. ............................... 417/313

*Primary Examiner*—Charles Freay

[57] ABSTRACT

In a lubrication system subject to two phase flow, the oil pump is provided with a capacity such that it can always pump sufficient oil plus the refrigerant and/or excess oil. The excess oil and/or outgassed refrigerant is vented to provide the desired lubricant flow.

4 Claims, 2 Drawing Sheets

OIL PUMP SUBJECT TO PUMPING A TWO PHASE FLOW

BACKGROUND OF THE INVENTION

There is an affinity between refrigerants and lubricants such that one is normally present with the other in refrigeration systems. As a result, when pumping oil into the lubrication system, the pressure drop at the suction side of the oil pump can cause outgassing such that a two phase flow is being pumped. While oil is incompressible, the two phase flow is compressible. A problem associated with outgassing and two phase flow is a decreased ability to prime such that 8–12 minutes may elapse before an adequate pumping pressure is reached. Maintaining lubricant flow during transients which are dominated by two phase flow is as important as oil delivery in steady state operation. The transients can be the result of system pressure fluctuations acting on the sump as well as the result of heating, as by friction, all of which can produce outgassing and thereby two phase flow. The synthetic oils, such as polyol ester oils (POE), used with the new refrigerants release dissolved refrigerants much more rapidly than mineral oil and, as a result, the maintenance of adequate oil pressure under transient conditions is more difficult. A characteristic of the POE oils is that because they are more polar they do not "wet" the surfaces of the more polar metals such as aluminum or tin as well as mineral oil. As a result, more polar metals must be supplied continuously with a flow of oil from the pump i.e. with POE oils the pump must replenish the oil film with minimal interruption.

Commonly assigned U.S. patent application Ser. No. 85,793 filed Jul. 6, 1993, and now U.S. Pat. No. 5,295,815, addresses a portion of the problem. Specifically, that invention teaches the drawing in of unagitated oil. The oil pickup is isolated from the chamber where rotation of the members produces outgassing and centrifugal separation which tends to force oil from the oil inlet. However, that invention does not address pumping a two phase flow in the sense of specifically accommodating the two phase flow as the pumped fluid.

SUMMARY OF THE INVENTION

A standard oil pump has been modified to efficiently pump a two phase flow. Due to synergism, the effect of the modifications is greater than the sum of the effects of each change by itself. The primary effect is an essentially instantaneous priming so that oil is more rapidly delivered to the bearings and other parts requiring lubrication.

The accommodation of two phase flow in a pump designed for pumping an incompressible fluid requires an increased displacement to increase the capacity represented by the presence of gas, a reduced clearance volume to minimize the residual gas in the suction chamber and better sealing so that leakage from the trapped volume and/or pump discharge is minimized. Additionally, it is desirable to employ the inlet tube of application Ser. No. 85,793 to minimize the injection of separated gas into the compressor.

It is an object of this invention to provide quicker priming.

It is another object of this invention to provide an oil pump capable of pumping two phase flow. These objects, and others, as will become apparent hereinafter, are accomplished by the present invention.

Basically, lubricant subject to being a two phase flow of lubricant and refrigerant gas is pumped into a lubrication system by a pump having a capacity corresponding to the desired lubricant flow plus that necessary to accommodate refrigerant gas present during two phase flow. Clearance volume and leakage are minimized to avoid residual refrigerant gas which expands and adds more gas to the two phase flow supplied to the pump. Preferably the lubricant is drawn into the pump from an unagitated source. A relief valve or orifice is provided to limit and flatten the pressure resulting from the excess capacity for handling two phase flow.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENT

Figure 1:
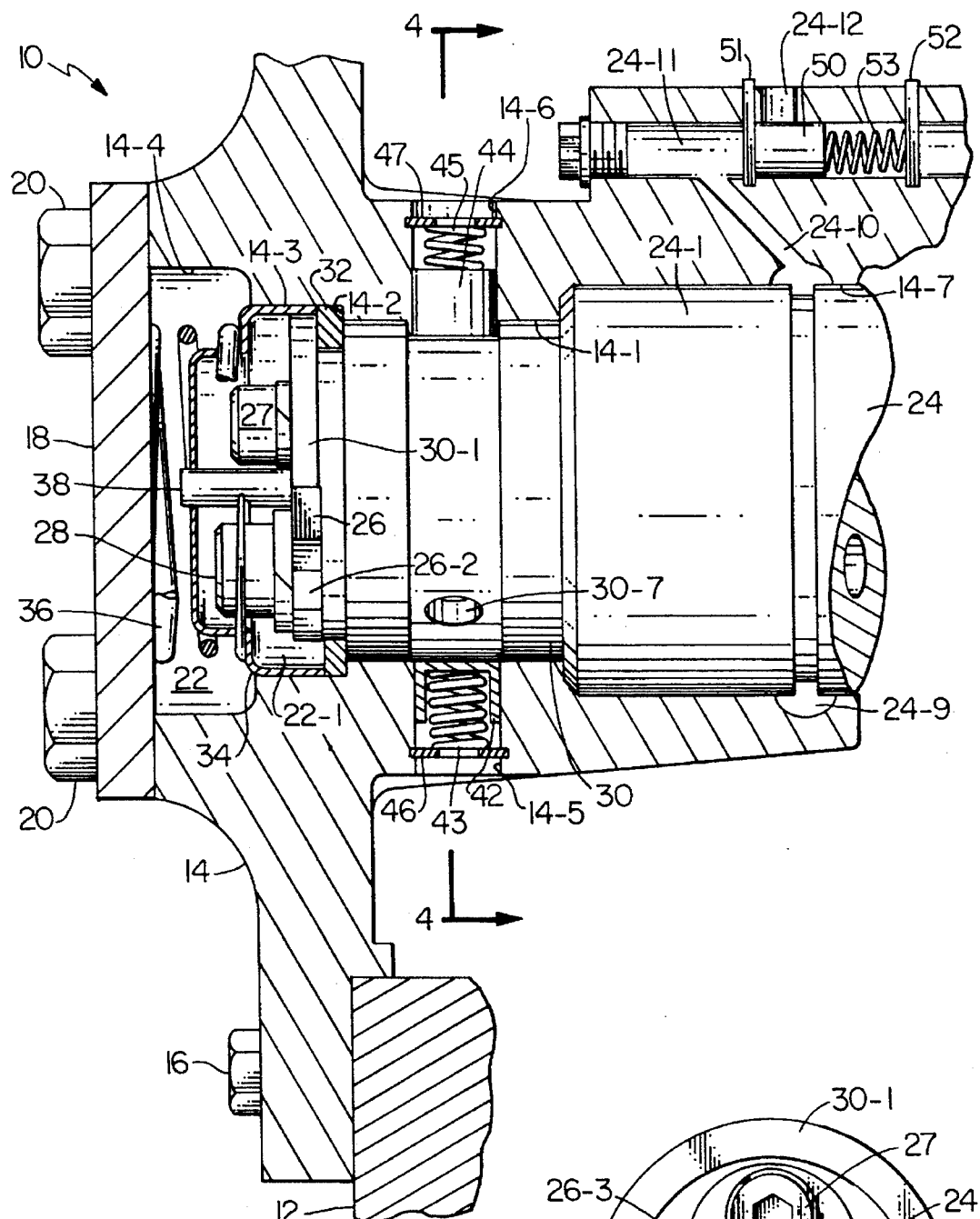
FIG. 1 is a partially sectioned view of the oil supply structure.
Figure 3:
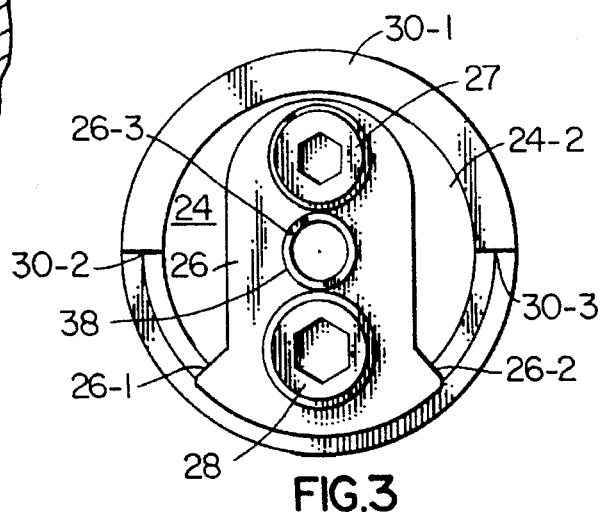
FIG. 3 is an end view of the oil supply structure of FIG. 1.
Figure 2:
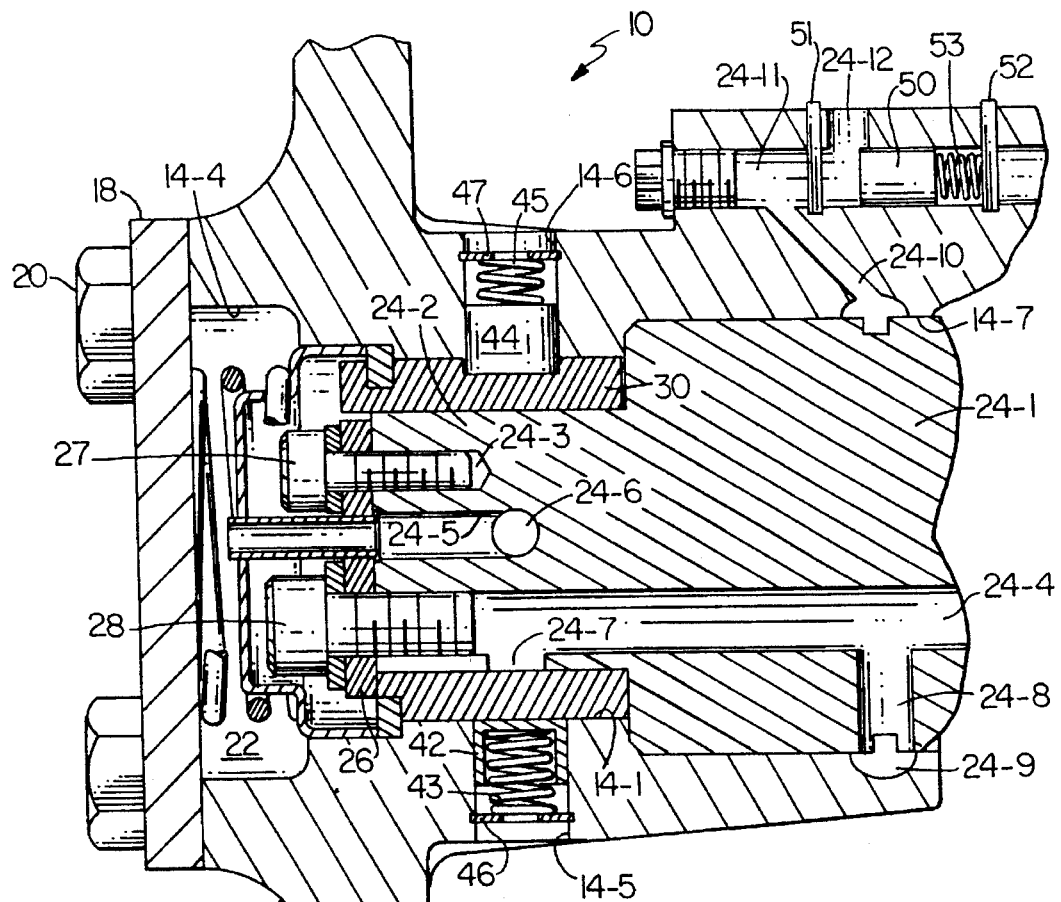
FIG. 2 is a sectioned view corresponding to FIG. 1.
Figure 4:
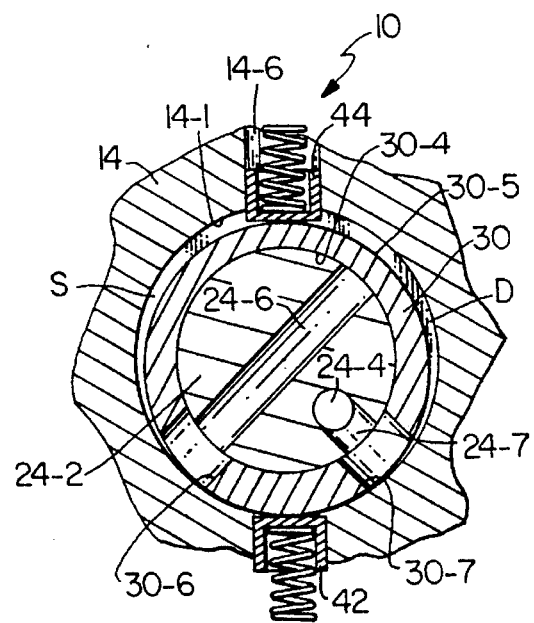
FIG. 4 is a sectional view taken along line 4—4 of FIG. 1.

In FIGS. 1, 2 and 4 the numeral 10 generally designates a semi-hermetic reciprocating compressor having a casing 12. Pump housing and bearing member 14 is bolted to casing 12 by bolts 16. Pump housing and bearing member 14 has a first bore 14-1, a second bore 14-3 coacting with bore 14-1 to form a shoulder 14-2, and a third bore 14-4. Cover 18 is bolted to member 14 by bolts 20 and coacts with bores 14-3 and 14-4 to define oil sump 22 which is connected to and fed by oil inlet structure (not illustrated).

Additionally, pump housing and bearing member 14 has a pair of bores 14-5 and 14-6 for respectively receiving cylindrical vanes 42 and 44. Spring 43 is retained in bore 14-5 by spring retainer 46 and biases vane 42 into tracking, sealing contact with rotor 30. Similarly, spring 45 is retained in bore 14-6 by spring retainer 47 and biases vane 44 into tracking, sealing contact with rotor 30. Crankshaft 24 has a first portion 24-1 supported by a bearing defined by bore 14-7 contained in member 14 and an overhung portion 24-2. Tang 26 is bolted to the end of the overhung portion 24-2 of crankshaft 24 by bolts 27 and 28 which are received in threaded bores 24-3 and 24-4, respectively. Tang 26 has a pair of driving surfaces 26-1 and 26-2.

Pump rotor 30 is located in bore 14-1 and surrounds the overhung portion 24-2 of crankshaft 24. Snap ring 32 is biased against shoulder 14-2 by spring 36 acting upon spring retainer 34 and serves to keep rotor 30 within bore 14-1. This bias force provided by spring 36 against retainer 34 also serves to prevent the retainer 34 from rotating with the other members. Rotor 30 has an axially extending generally semi-circular portion 30-1 which terminates in driven surfaces 30-2 and 30-3 which are engaged by driving surfaces 26-1 and 26-2, respectively, according to the direction of rotation of crankshaft 24.

As is best shown in FIG. 4, pump rotor 30 has a bore 30-4, an eccentric 30-5, radial ports 30-6 and 30-7 formed in the eccentric 30-5 and spaced approximately 90° apart and symmetrical with respect to a tangent of the eccentric 30-5 with the rest of rotor 30. As illustrated in FIG. 4, when rotor 30 is rotated counterclockwise, port 30-6 is a suction port and port 30-7 is a discharge port. When rotor 30 is rotated clockwise, port 30-7 is a suction port and port 30-6 is a discharge port. Vanes 42 and 44 are biased against the cylindrical surface of eccentric 30-5 by springs 43 and 45, respectively. Although vanes 42 and 44 are cylindrical, there is line contact between the vanes and the eccentric so that there is potential leakage while the line contact is passing over ports 30-6 and 30-7. Leakage is minimized by locating ports 30-6 and 30-7 in the portion of the eccentric 30-5 having the least depth, due to the restricted flow path between the vanes 42 and 44 the eccentric 30-5 as ports 30-6 and 30-7 pass over them and, ultimately, due to the wearing of the vanes into a surface conforming to the eccentric 30-5.

Crankshaft 24 has an axial bore 24-5 intersected by diametral bore 24-6. Depending upon the direction of rotation, one end of diametral bore 24-6 is in fluid communication with the one of ports 30-6 and 30-7 which is serving as a suction port while radial bore 24-7 is in fluid communication with the other one of ports 30-6 and 30-7 which is serving as a discharge port. Radial bore 24-7 is in fluid communication with threaded bore 24-4 which receives bolt 28.

Inlet tube 38 is located in bore 26-3 of tang 26 and extends axially at least to, and preferably, beyond spring retainer 34. Spring retainer 34 isolates chamber 22-1 from the rest of sump 22. Tang 26, bolts 27 and 28 and portion 30-1 of rotor 30 are located in chamber 22-1. In operation, when crankshaft 24 is caused to rotate, tang 26 which is bolted thereto by bolts 27 and 28 rotates therewith as a unit. Depending upon the direction of rotation of crankshaft 24, either driving surface 26-1 engages driven surface 30-2 or driving surface 26-2 engages driven surface 30-3 causing pump rotor 30 to be driven as a unit with crankshaft 24 and tang 26. The rotation of the bolt heads of bolts 27 and 28 in chamber 22-1 causes the generation of foam which tends to be held in chamber 22-1 by spring retainer 34. If tube 38 was not present, the spinning heads of bolts 27 and 28 would surround bore 26-3 such that a vortex would form and, due to centrifugal separation, foam would tend to be drawn into bore 26-3 and fed to the oil pump via axial and radial bores 24-5 and 24-6, respectively, in crankshaft 24. The presence of foam in chamber 22-1 would therefore tend to result in the delivery of a significant amount of refrigerant gas to the lubrication system. Tube 38 extends through chamber 22-1 into sump 22 which is essentially undisturbed by the rotation of bolts 27 and 28 as tang 26 is driven by crankshaft 24. Thus, oil from sump 22 which is essentially free of foam is drawn into tube 38 and fed to the oil pump.

Specifically oil serially passes through inlet tube 38, axial bore 24-5 and diametral bore 24-6. If, as illustrated in FIG. 4, crankshaft 24 and rotor 30 are rotating counterclockwise, driving surface 26-2 is in engagement with driven surface 30-3 and flow from bore 24-6 passes through port 30-6 into the space S between eccentric 30-5 and bore 14-1 which is circumferentially bound by the tangent point between eccentric 30-5 and bore 14-1 and the one of vanes 42 and 44 located clockwise with respect to port 30-6. Fluid from space D which is between eccentric 30-5 and bore 14-1 and circumferentially bound by the tangent point between eccentric 30-5 and bore 14-1 and the one of vanes 42 and 44 located counterclockwise with respect to port 30-7 is forced into port 30-7 and serially passes through radial bore 24-7 and bore 24-4. As crankshaft 24 rotates, the coaction of eccentric 30-5, bore 14-1, vanes 42 and 44 and the tangent sealing point between eccentric 30-5 and bore 14-1 causes oil to be drawn in and supplied to a pumping chamber via port 30-6 and forced out of a pumping chamber and supplied to bore 24-7 via port 30-7. The pumping chambers switch from suction to discharge as the suction port, 30-6 in FIG. 4, goes out of communication therewith and the discharge port, 30-7 in FIG. 4, comes into communication therewith. The reverse would be true if crankshaft 24 was rotating clockwise.

Oil passing through discharge port 30-7, radial bore 24-7 and into bore 24-4 is supplied to locations requiring lubrication by distribution means exemplified by radial bore 24-8. As noted above, the present invention always supplies adequate oil plus refrigerant during two phase flow and excess oil at other times. Neither the refrigerant nor the excess oil is desirable in the lubrication distribution path. Accordingly, relief structure is provided to exhaust the outgassed refrigerant and/or the excess oil. Radial bore 24-8 communicates with annular lubrication groove 24-9 which is in fluid communication with bore 24-11 via passage 24-10. Piston valve 50 is located in bore 24-11 between pin 51 which acts as a valve seat and pin 52 which acts as a spring retainer for spring 53. The bias of spring 53 is opposed by the pressure of the oil delivered to annular lubrication groove 24-9. When the pump has primed and thereby built up sufficient pressure, valve 50 will be moved against the bias of spring 53, as illustrated in FIG. 2, to permit outgassed refrigerant and/or excess oil to pass into the crankcase of compressor 10 via port 24-12 whereby the oil delivery is maintained even under conditions of two phase flow.

Although a preferred embodiment of the present invention has been illustrated and described, other modifications will occur to those skilled in the art. It is therefore intended that the present invention is to be limited only by the scope of the appended claims.

What is claimed is:

1. For a compressor having an oil pump driven by a crankshaft and an oil supply subject to becoming a two phase flow, a method of operating said oil pump subject to pumping a two phase flow for delivering oil to a lubrication system located in said crankshaft including the steps of:

pumping from said oil supply solely to said lubrication system at a rate sufficient to furnish a desired amount of oil under two phase flow conditions;

venting excess oil and outgassed refrigerant so as to deliver an amount of oil equal to said desired amount to said lubrication system.

2. The method of claim 1 wherein venting only takes place after the pump is primed.

3. An oil pump driven by a crankshaft for delivering oil subject to being in a two phase flow from an oil supply to a lubrication system located in said crankshaft comprising:

an oil pump normally delivering to said lubrication system an amount of flow equal to a desired amount of oil plus an amount equal to the gaseous portion of a two phase flow which may be present as excess oil and outgassed refrigerant;

means for venting excess flow beyond said desired amount of oil; and means for delaying said venting until priming of said oil pump is achieved.

4. The oil pump of claim 3 wherein said pump is supplied from an undisturbed oil sump.

\* \* \* \* \*